United States Patent [19]

Hirao et al.

[11] Patent Number: 4,991,944

[45] Date of Patent: Feb. 12, 1991

[54] ZOOM LENS DRIVING APPARATUS

[75] Inventors: Yoshiaki Hirao, Habikino; Ryuichiro Kuga, Katano; Masayuki Yoneyama, Takatsuki; Shusuke Ono, Takatsuki, all of Japan

[73] Assignee: Matsushita Electric Industrial Co., Ltd., Osaka, Japan

[21] Appl. No.: 290,195

[22] Filed: Dec. 27, 1988

[30] Foreign Application Priority Data

Dec. 28, 1987 [JP] Japan ............... 62-331913

[51] Int. Cl.$^5$ .............................. G02B 15/00
[52] U.S. Cl. ...................... 350/429; 358/227
[58] Field of Search ............. 350/429, 430; 354/400, 354/402, 409; 358/225, 227

[56] References Cited

U.S. PATENT DOCUMENTS 4,054,372 10/1977 Schröeder .................. 350/429
4,697,891 10/1987 Kawai ....................... 350/429
4,735,495 4/1988 Makino et al. .............. 350/429

Primary Examiner—Bruce Y. Arnold
Assistant Examiner—Loha Ben
Attorney, Agent, or Firm—Wenderoth, Lind & Ponack

[57] ABSTRACT

A zoom lens driving apparatus always detects a position of an image magnification varying lens section, and drives the image magnification varying lens section in accordance with a preset relationship between the position of the image magnification varying lens section and a zoom driving speed in such a manner that the driving speed becomes higher on one side, where the focal length of the zoom lens corresponding to the position of the image magnification varying lens section is small, than on another side where the focal length is large. Accordingly, the amount of focal shift, which in the zoom lens of the inner focusing system would otherwise abruptly increase with increasing focal length, is significantly suppressed, so that an auto focus adjusting mechanism or a focus correcting device effective during zooming, provided in the zoom lens, can function satisfactorily as to follow the focal shift of the zoom lens, whereby the lens control of a superior response can always be achieved.

6 Claims, 4 Drawing Sheets

POSITION OF IMAGE MAGNIFICATION VARYING LENS SECTION D
(AMOUNT OF SHIFT OF SECOND LENS UNIT RELATIVE TO
WIDE ANGLE END)

ZOOM LENS DRIVING APPARATUS

BACKGROUND OF THE INVENTION

1. Field of the Invention

The present invention relates to a zoom lens driving apparatus for electrically controlling the zooming of a camera.

2. Description of the Prior Art

For zooming the zoom lens of video cameras and the like, generally, one method drives an image magnification varying lens section, which is a part of the zoom lens and has an image magnification varying function, by a motor via a power transmission mechanism. In this respect, the image magnification varying lens section is usually driven at a predetermined constant speed for simplifying the driving circuit.

Recently, as the focusing system of the zoom lens, a so-called inner focusing system has been put in practice which is arranged such that a second lens component or a more rear side lens is driven. This system, as compared with the front focusing system, is light in weight with respect to the focus adjusting lens section, small in driving force, and short in minimum shooting distance.

However, the zoom lens of the inner focusing system causes a focal shift of the lens in response to a zooming operation. In the zoom lens of the inner focusing system, the moving distance s of the focus adjusting lens section (composed of the second lens and a more rear side lens) along the optical axis of the camera relative to a position at which an infinite-point object is focused is given by the following approximate expression:

$$s \approx f^2/u \quad (1)$$

where f is the focal length of the zoom lens and u is the camera-to-object distance.

FIG. 2 shows a relationship of the expression (1) between the focal length f of the zoom lens (abscissa) and the moving distance s of the focus adjusting lens section (ordinate). That is, $s=0$ for $u=\infty$, and $s=f^2/u_{near}$, for the minimum shooting distance ($u=u_{near}$).

As is clear from expression (1), the moving distance s of the focus adjusting lens section is proportional to the square of the focal length f. Accordingly, in the zoom lens of the inner focusing system, even if the object distance u is constant, the moving distance (i.e. the focused position) of the focus adjusting lens section varies as the focal length varies. In FIG. 2, a point N corresponds to the focal length $f=f_N$ of the zoom lens, indicating that the lens is focused on an object positioned at the minimum shooting distance (the moving distance amount of the focus adjusting lens section $=s_N$). If the zoom lens is subjected to zooming such that the focal length varies from $f_N$ to $f_W (f_N > f_W)$ with the position of the object kept unchanged and the focus adjusting lens section also unchanged, the zoom lens assumes the state represented by a point W in FIG. 2 (the moving distance of the focus adjusting lens section $=s_N$), resulting in a large focal shift ($|s_N - s_W|$) where $s_W = f_W^2/u_{near}$.

Generally, there is no linear relationship between the position D of the image magnification varying lens section and the corresponding focal length f of the zoom lens. Taking a conventional four-component zoom lens for a video camera as an example, FIG. 3 shows an example of the relationship between the position D of the image magnification varying lens section of the conventional zoom lens and the corresponding focal length f of the zoom lens. In FIG. 3, the abscissa represents the position D of the image magnification varying lens section (the amount of shift of the second lens component) relative to the wide angle end, while the ordinate axis represents the corresponding focal length f of the zoom lens. In the conventional four-component zoom lens for the video camera, as shown in FIG. 3, the amount of change (df/dD) of the focal length f of the zoom lens with respect to a change of the position D of the image magnification varying lens section has a tendency to increase as the focal length becomes larger.

Assume that a zooming operation is performed with the object distance unchanged, and differentiating both sides of the expression (1) by time t, the following expression is obtained:

$$(ds/dt) = (2f/u) \cdot (df/dt). \quad (2)$$

By modifying the expression (2), the following relationship is obtained:

$$(ds/dt) = (2f/u) \cdot (df/dD) \cdot (dD/dt). \quad (3)$$

Assuming that the zooming operation is performed at a fixed speed, the image magnification varying lens section is driven at a predetermined constant speed, i.e., (dD/dt) in the expression (3) is constant, so that the temporal change (ds/dt) of the moving distance s of the focus adjusting lens section is proportional to (df/dD). Thus, as described above, (df/dD) increases as the focal length f becomes large, and the amount of the focal shift increases.

Nowadays, from the viewpoint of operability, an auto focus adjusting mechanism has been becoming indispensable to the camera with the zoom lens built therein. However, where the auto focus adjusting mechanism is incorporated with the zoom lens of the inner focusing system, as described above, the amount of change of the focal shift caused by zooming becomes large, especially on the large focal length side. Consequently, the response of the auto focus adjusting mechanism cannot follow such a change, resulting in a severe out-of-focus state or mis-operation.

On the other hand, a focus correcting device effective during zooming is publicly known which makes a calculation using the position information of the focus adjusting lens section and of the image magnification varying lens section of the zoom lens and controls the focusing lens section to correct an out-of-focus state caused during zooming (Japanese Laid-Open Patent Application No. 49-115322). However, also in this system, the amount of change of the focal shift due to zooming increases on the large focal length side, so that a correcting operation cannot follow the change, thereby degrading the lens response.

SUMMARY OF THE INVENTION

It is an object of the present invention to provide a zoom lens driving apparatus for a zoom lens of the inner focusing system which causes no degradation of an in-focus state even during zooming and always results in a good response.

To achieve the above object, a zoom lens driving apparatus according to the present invention comprises a zoom encoder for detecting a position of an image magnification varying lens section of a zoom lens, a zoom driving unit for driving the image magnification varying lens section, and a zooming control unit for controlling the zoom driving unit to stop, start and drive at a controlled speed the image magnification varying lens section.

With this configuration, the zooming control unit always perceives the position of the image magnification varying lens section detected by the zoom encoder, and, in accordance with a predetermined relationship between the position of the image magnification varying lens section and the zoom driving speed, a speed is set higher on one side, where the focal length of the zoom lens corresponding to the position of the image magnification varying lens section is small, than on another side where the focal length is large. In detail, by supplying to the zoom driving unit a control signal indicating a driving speed being set so as to be inversely proportional to the ratio of a change of the position of the image magnification varying lens section to a change of the focal length, a changing tendency of the amount of focal shift, which in the zoom lens of the inner focusing system would otherwise abruptly increase with increasing focal length, is significantly suppressed, so that an auto focus adjusting mechanism or a focus correcting device which is effective during zooming, and which is provided in the zoom lens, can function satisfactorily so as to follow a focal shift of the zoom lens, whereby the lens control of a superior response can always be achieved.

DESCRIPTION OF THE PREFERRED EMBODIMENT

Figure 1:
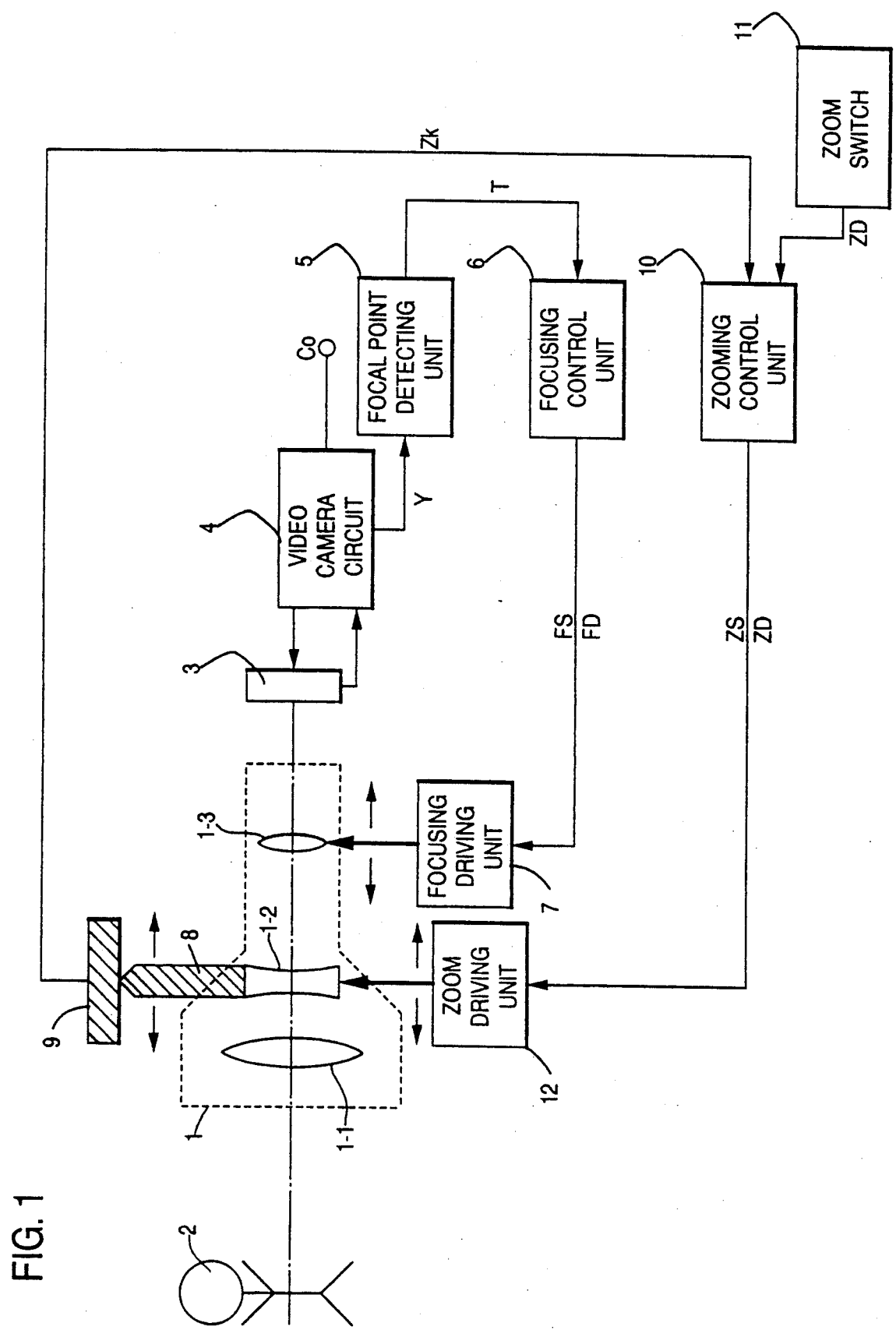
FIG. 1 is a block diagram showing an embodiment of the present invention.
Figure 2:
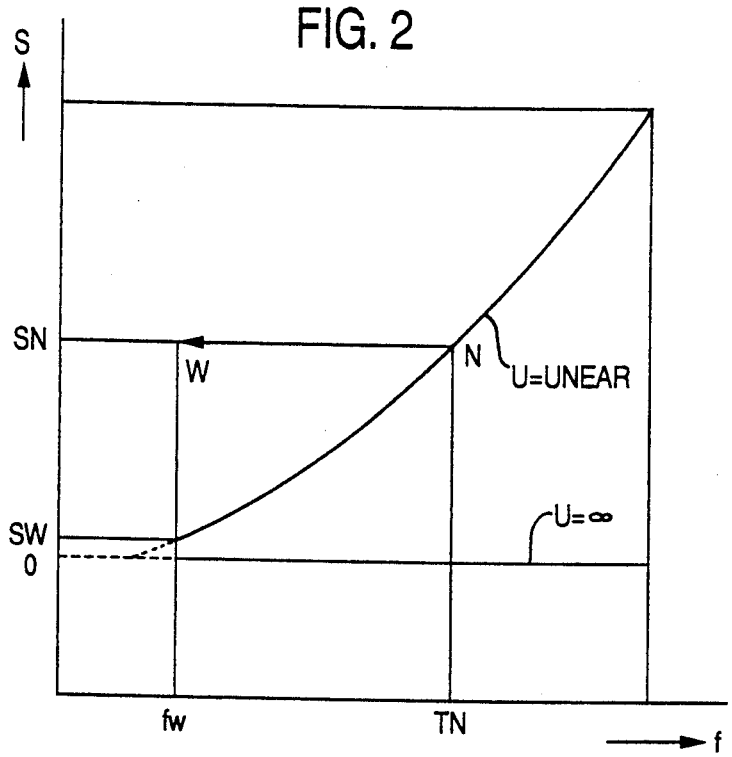
FIG. 2 is a graph showing a relationship between the focal length of a zoom lens of the inner focusing system and the moving distance of a focus adjusting lens section.

FIG. 1 is a block diagram showing an embodiment of the present invention which is applied to a video camera provided with an auto focus adjusting device. In FIG. 1, a zoom lens 1 is composed of a first lens unit 1-1 having a positive refracting power, a second lens unit 1-2 having a negative refracting power and an image magnification varying function, and a third lens unit 1-3 having a positive refracting power and an image forming function, these units being arranged in this order from the side of an object to be shot. Although each lens unit is illustrated as being made of one convex lens or concave lens for the sake of convenience, each of these lens units in practice is made of a plurality of convex lenses or concave lenses. In the embodiment, the second lens unit 1-2 constitutes an image magnification varying lens section, whereas the third lens unit 1-3 constitutes a focus adjusting lens section.

The image of an object 2 is inputted to a CCD 3 through the zoom lens 1. A video camera circuit 4 drives the CCD 3 and subjects an electrical signal obtained by the CCD 3 to a variety of well-known signal processing, thereby outputting a video signal (e.g. an NTSC signal) Co.

A focal point detecting unit 5 judges the focal state of the zoom lens 1 by detecting an increase/decrease, over a plurality of fields, of components of frequencies higher than a certain frequency (hereinafter referred to as high-frequency components) contained in a luminance signal output from the video camera circuit 4, and supplies a control signal T to a focusing control unit 6. This type of focal point detecting unit is publicly known and disclosed in greater detail in, for example, a paper of Ishida et al. ("NHK Gijutsu Kenkyu" vol. 17, No. 1, page 21, issued in 1965) titled "Auto Focus Adjustment of Television Camera in In-Focus Control Servo System".

The focusing control unit 6 generates, on the basis of the control signal T, a focusing speed signal FS and a focusing direction signal FD for defining a driving speed and a driving direction, respectively, and supplies them to a focusing driving unit 7. The focusing driving unit 7 moves the third lens component 1-3 of the zoom lens 1 to a given position to achieve auto focus adjustment.

The operation of a zoom lens driving apparatus fulfilling the object of the present invention will now be described which decreases the ratio of change of a focal shift that would appear in response to the zooming of the zoom lens of the inner focusing system and increase particularly on the large focal length side.

Let $D_{1-2}$ represent the position of the image magnification varying lens section of the zoom lens 1 which is represented by the distance between the principal points of the first lens unit 1-1 and the second lens unit 1-2 (hereinafter referred to as the distance between lens units 1-1 and 1-2). The relationship between $D_{1-2}$ and the focal length f of the zoom lens 1 is identical with that of the foregoing expression (3) with D replaced by $D_{1-2}$. Let $s_3$ represent the moving distance of the focus adjusting lens section 1-3 relative to its position focused on an infinite-point object as a reference. Accordingly, the foregoing expression (3) becomes as follows:

$$(ds_3/dt) = (2f/u) \cdot (df/dD_{1-2}) \cdot (dD_{1-2}/dt). \tag{4}$$

If the value of $(dD_{1-2}/dt)$ representing the zooming speed is set so as to be proportional to $(df/dD_{1-2})^{-1}$, then the value indicates the temporal change of the moving distance $s_3$ of the focus adjusting lens section 1-3, i.e. the amount term focal shift. The term of $(ds_3/dt)$ is proportional to the first power of the focal length f. That is, the amount of focal shift holds a linear relationship with the focal length over the whole range of focal length, and the ratio of change of the focal shift is remarkably suppressed on the large focal length side.

A method of implementing the foregoing operation in an actual system will now be described.

Figure 4:
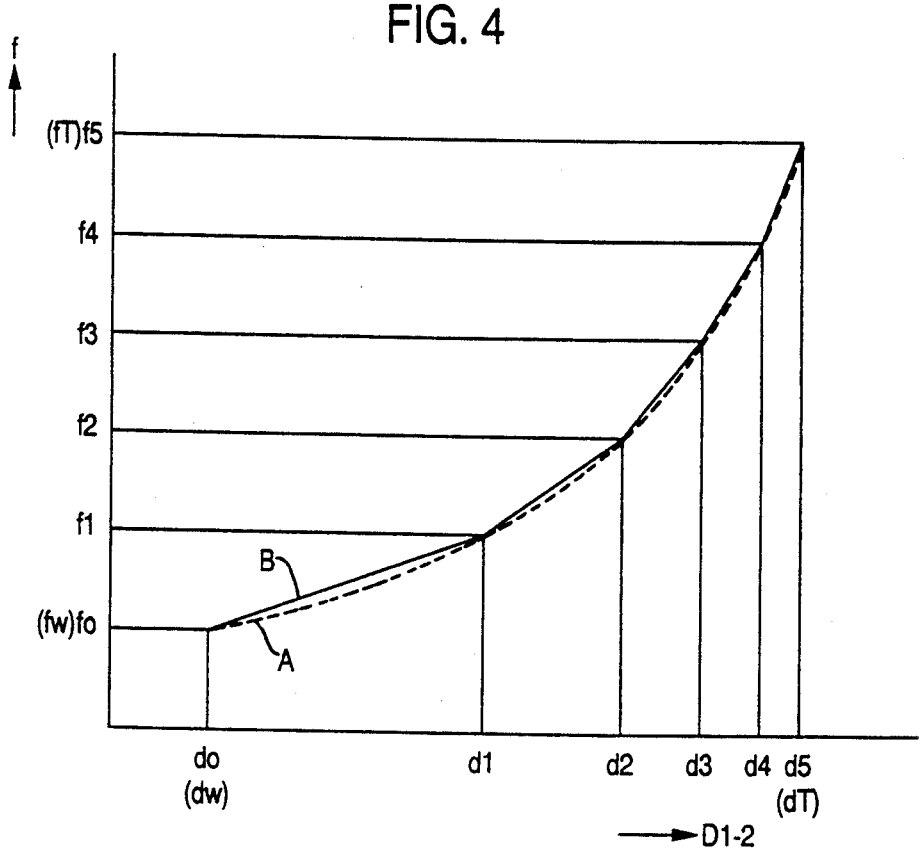
FIG. 4 is a graph showing a relationship between the position of the image magnification varying lens section and the focal length of a zoom lens according to the embodiment which is used to set a zoom driving speed.
Figure 3:
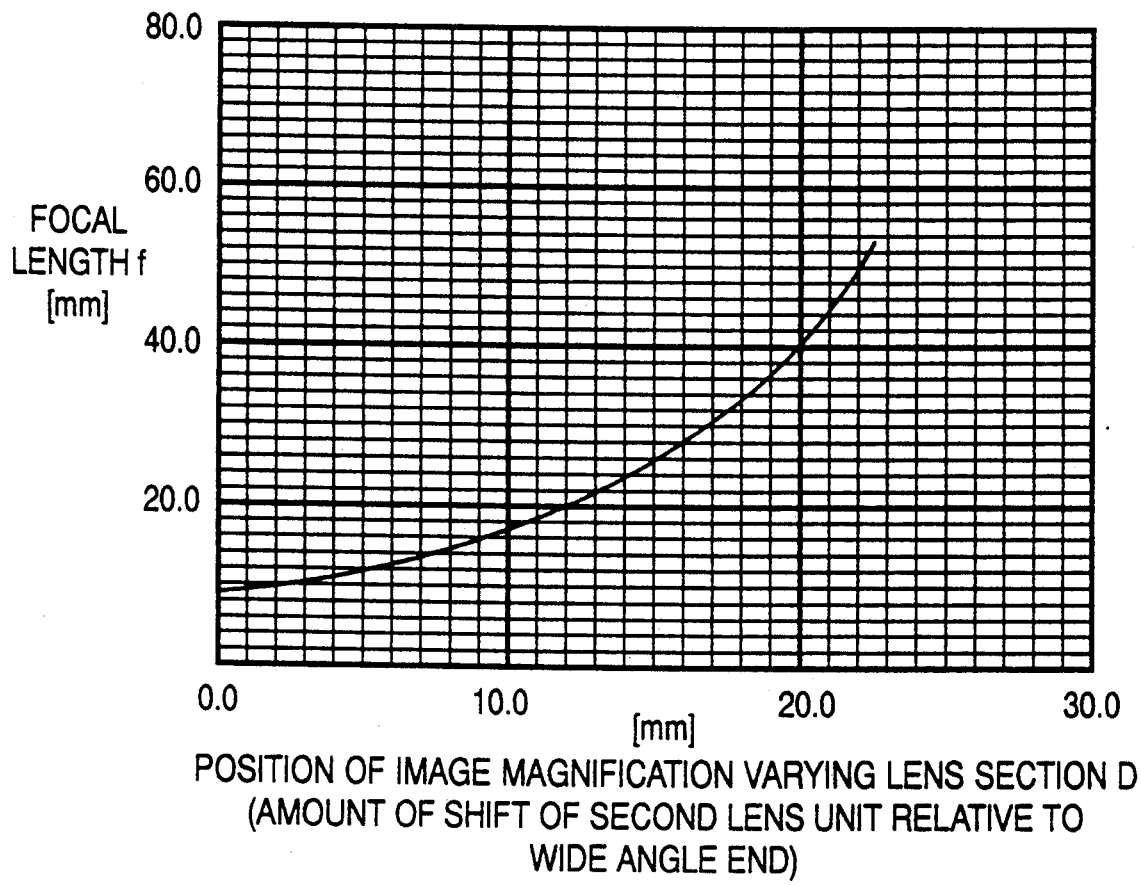
FIG. 3 is a graph showing a relationship between the position of the image magnification varying lens section of a conventional four-component zoom lens and the corresponding focal length of the zoom lens.

In FIG. 4, a dotted line A illustrates an example of the relationship between f and $D_{1-2}$ wherein the focal length f of the zoom lens 1 is represented by the ordinate and the distance $D_{1-2}$ between lens units 1-1 and 1-2 of the zoom lens 1 by the abscissa. That is, the distance $D_{1-2}$ varies between $d_W$ and $d_T$, whereas the focal length f varies between $f_W$ and $f_T$ correspondingly. The affixed letters W and T mean a wide angle setting end (the smallest focal length) and a telephoto end (the largest focal length), respectively.

In the embodiment, as shown in FIG. 4, individual values $d_0$, $d_1$, $d_2$, $d_3$, $d_4$ and $d_5$ of the distance $D_{1-2}$ are set so as to correspond to individual values $f_0$, $f_1$, $f_2$, $f_3$, $f_4$ and $f_5$ of the focal length f with which the range of focal length $f_T$ to $f_W$ is divided equally into five, and a zoom encoder 9 is configured so as to discriminate at least the six values of $D_{1-2}$. The optimum zoom driving speed depending on the position of the image magnification varying lens section, featuring the spirit of the present invention, will be set in the following manner.

In FIG. 4, a solid line B is an approximate polygonal line based on the dotted line A representing the relationship between the focal length f and the distance $D_{1-2}$, which is drawn by connecting the respective values of the six points $d_0$, $d_1$, $d_2$, $d_3$, $d_4$ and $d_5$ of $D_{1-2}$. In this regard, the gradient $h_k$ of each polygonal line segment in each interval, $d_{k-1}$ to $d_k$ ($k = 1, 2, \ldots, 5$) is given by $$h_k = (f_k - f_{k-1})/(d_k - d_{k-1}) \quad (5)$$
$$(k = 1, 2, \ldots, 5)$$

which is the representative of $(df/dD_{1-2})$ for each interval. Hence, the zoom driving speed is set in each interval so as to be inversely proportional to $h_k$. That is, the zoom driving speed $v_k$ ($k = 1, 2, \ldots, 5$) of each interval is given by $$v_1 : v_2 : v_3 : v_4 : v_5 = h_1^{-1} : h_2^{-1} : h_3^{-1} : h_4^{-1} : h_5^{-1}. \quad (6)$$

Therefore, the zoom driving seed is uniquely determined by the expression (6) and the conditions of response of the auto focus adjusting mechanism.

With the foregoing provisions, the ratio of change of the focal shift or the amount of focal shift ($ds_3/dt$) in each interval becomes substantially proportional to the focal length f in accordance with the expression (4), and the ratio of change of the focal shift is significantly suppressed on the large focal length side.

Referring back to FIG. 1, in the embodiment, when the second lens unit 1-2 begins moving, a sliding element 8 linked to that lens unit moves on the zoom encoder 9, and the zoom encoder 9 reads out the current position of the second lens unit 1-2 which will fall within one of the five intervals described above, and delivers an image magnification varying lens position signal $Z_k$ ($k = 1, 2, \ldots, 5$). A zooming control unit 10 receives the image magnification varying lens position signal $Z_k$ and generates a zoom speed signal ZS which designates the driving speed $v_k$ defined as above of the second lens unit 1-2. The zooming control unit 10 is readily realized by a microcomputer, for example. When a cameraman depresses a zoom switch 11 to perform zooming, a zooming signal ZD is sent to the zooming control unit 10 which designates the direction of zooming with the cameraman's wishes. A zoom driving unit 12 receives the zooming signal ZD and the zoom speed signal ZS and drives the second lens unit 1-2.

In the foregoing manner, when the zoom lens 1 is subjected to zooming, the auto focus adjusting mechanism responds sufficiently to the focal shift of the zoom lens 1 and always achieves lens control satisfactorily.

As will be appreciated, the embodiment can be very effectively applied to the video camera and the like provided with the foregoing correcting device for correcting the out-of-focus state due to zooming by making a calculation on the basis of the position information of the focus adjusting lens section and image magnification varying lens section of the zoom lens.

In the correcting device, the amount of shift b of the focus adjusting lens section caused by zooming is calculated in accordance with a function F on the basis of the position a of the focus adjusting lens section in the infocus state and the amount of shift c thereof from the reference position (e.g. the telephoto end position) of the image magnification varying lens section when zooming is performed as follows:

$$b = F(a, c) \quad (7)$$

where F (a, c) is the function determined by the refracting power of the lens system and the distance of principal points.

Figure 5:
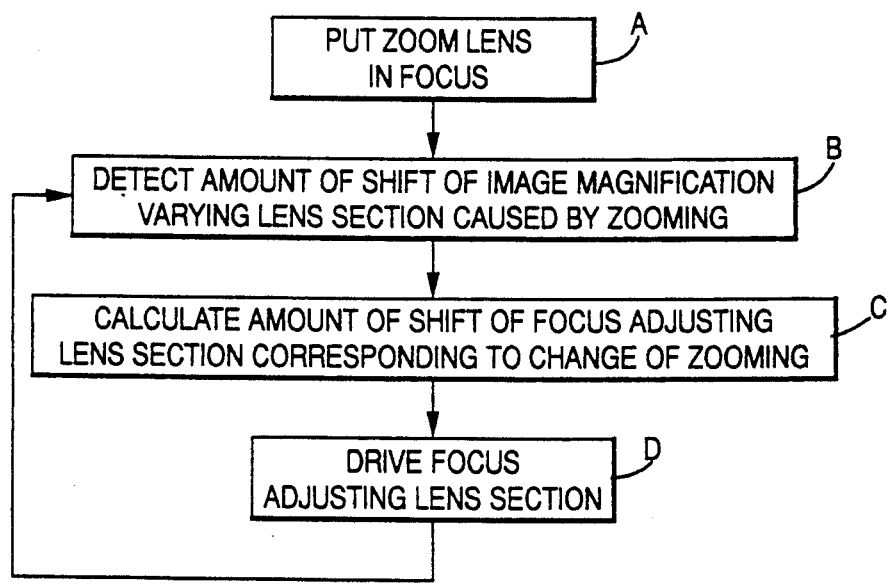
FIG. 5 is a flowchart for explaining the operation during zooming of a focal shift correcting device.

FIG. 5 is a flowchart showing the operation of the correcting device. In step A, the zoom lens is put in focus manually or by means of the auto focus adjusting mechanism. In step B, zooming is performed, and the amount of shift a of the focus adjusting lens section and the amount of shift c of the image magnification varying lens section both caused by zooming are detected. In step C, the amount of shift b of the focus adjusting lens section corresponding to a change of zooming is calculated in accordance with the relationship of the expression (7). In step D, the focus adjusting lens section is driven on the basis of the results of the calculation such that the imaging position of the zoom lens is maintained unchanged.

Figure 6:
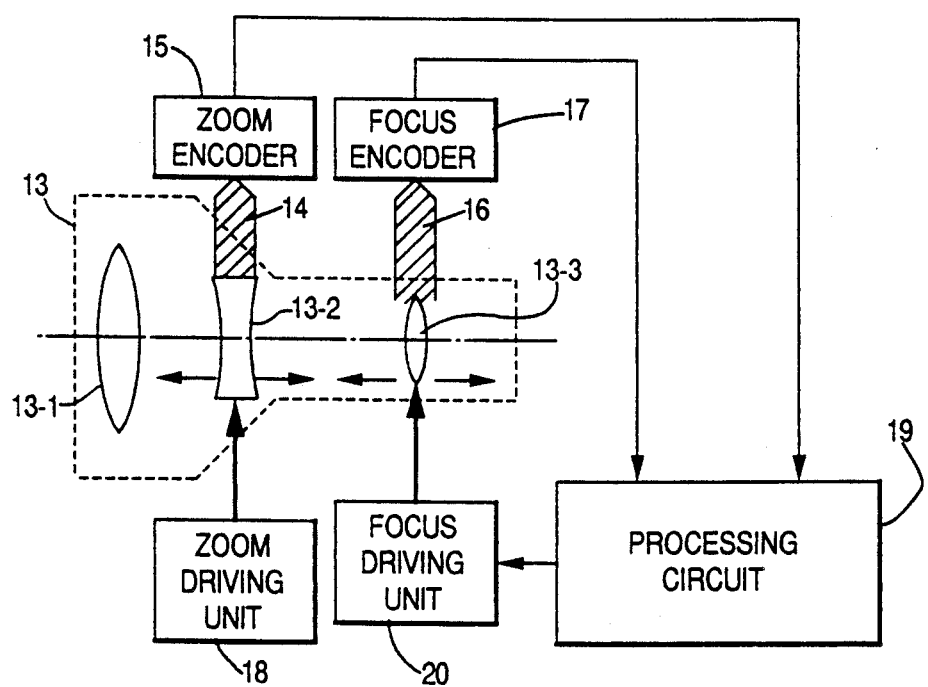
FIG. 6 is a block diagram for explaining important parts of the focal shift correcting device.

The foregoing correcting function will be realized by such a configuration as shown in FIG. 6. A zoom lens 13 has a configuration similar to that of the zoom lens 1 shown in FIG. 1, in which 13-2 is the image magnification varying lens section and 13-3 is the focus adjusting lens section. The positions of the image magnification varying lens section 13-2 and the focus adjusting lens section 13-3 are detected by a sliding element 14 and a zoom encoder 15 and by another sliding element 16 and a focus encoder 17, respectively. The image magnification varying lens section 13-2 is driven by a zoom driving unit 18 to perform zooming. A processing circuit 19 performs the foregoing calculation to send the results of calculation to a focus driving unit 20. The focus driving unit 20 moves the focus adjusting lens section 13-3 on the basis of the results of calculation to a position where the amount of shift b corresponding to the result of calculation is reached, and then keeps it stationary, whereat the adjustment of the focus is completed. The processing circuit 19 can be formed by a microcomputer including a read only memory (ROM) in practice.

The embodiment of the present invention can be very effectively applied to such a correcting device as above for correcting the focal shift caused by zooming. That is, according to the embodiment, the ratio of change of the focal shift is significantly suppressed on the large focal length side, and the processing time of, for example, the microcomputer for correcting the out-of-focus state caused by zooming can be sufficient enough. Furthermore, according to the embodiment, since the amount of focal shift has a linear relationship with the focal length, the calculation for correcting the out-of-focus state can be simplified.

What is claimed is:

1. A zoom lens driving apparatus comprising:
   a zoom encoding means for detecting a position of an image magnification varying lens section having an image magnification varying function of a zoom lens and for outputting a position signal indicative of a detected position of said image magnification varying lens section;

a zoom driving means for driving said image magnification varying lens section; and a zooming control means for controlling said zoom driving means;

wherein said zooming control means is responsive to said position signal outputted from said zoom encoding means for determining a zoom driving speed in accordance with a predetermined relationship between said position of said image magnification varying lens section and said zoom driving speed and for controlling said zoom driving means so as to move said image magnification varying lens section at a speed corresponding to said zoom driving speed.

2. A zoom lens driving apparatus according to claim 1, wherein said zoom driving speed is set such that it becomes higher on one side, where the focal length of the zoom lens corresponding to the position of the image magnification varying lens section is small, than on another side where the focal length is large.

3. A zoom lens driving apparatus according to claim 1, wherein for each position of said image magnification varying lens section, said zoom driving speed is set so as to be inversely proportional to a ratio of a change of the position of said image magnification varying lens section to a change of the focal length, said ratio being determined by the relationship between the position of said image magnification varying lens section and the focal length, said relationship being defined peculiarly to the zoom lens.

4. A zoom lens driving apparatus according to claim 1, wherein the position of said image magnification varying lens section detected by said zoom encoding means falls within one of a plurality of divisional regions arranged contiguously, and wherein said zoom driving speed is set to one value representatively with respect to one of the regions within which the position of said image magnification varying lens section falls.

5. A zoom lens driving apparatus according to claim 4, wherein the representative of the position of said image magnification varying lens section and of the focal length of the zoom lens is set with respect to each of the divisional regions, and the zoom driving speed for each region is set so as to be inversely proportional to a ratio of a change of the position of the image magnification varying lens section over its adjacent regions to a change of the focal length over the same adjacent regions.

6. A zoom lens driving apparatus according to claim 1, wherein the zoom lens is configured so that its focusing function is achieved by driving a second lens unit.

* * * * *